United States Patent
Tai

(10) Patent No.: US 8,271,829 B2
(45) Date of Patent: Sep. 18, 2012

(54) NETWORK CONNECTION DEVICE AND METHOD FOR DETECTING NETWORK ERRORS

(75) Inventor: Chuan-Chin Tai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 251 days.

(21) Appl. No.: 12/697,353

(22) Filed: Feb. 1, 2010

(65) Prior Publication Data

US 2011/0078517 A1 Mar. 31, 2011

(51) Int. Cl.
*G06F 11/07* (2006.01)

(52) U.S. Cl. .......... 714/4.1; 714/43; 709/224; 709/230; 709/245; 709/249; 709/250

(58) Field of Classification Search .................. 714/4.1, 714/43
See application file for complete search history.

(56) References Cited

U.S. PATENT DOCUMENTS

| | | | |
|---|---|---|---|
| 2005/0076281 A1* | 4/2005 | Kojima | 714/736 |
| 2005/0111384 A1* | 5/2005 | Ishihara et al. | 370/254 |
| 2006/0248220 A1* | 11/2006 | Funabiki et al. | 709/238 |
| 2007/0088815 A1* | 4/2007 | Ma et al. | 709/224 |
| 2007/0294427 A1* | 12/2007 | Retkin et al. | 709/245 |
| 2008/0005164 A1* | 1/2008 | Yee et al. | 707/104.1 |
| 2008/0215726 A1* | 9/2008 | Sullivan | 709/224 |
| 2009/0031033 A1* | 1/2009 | Deng et al. | 709/229 |
| 2009/0055730 A1* | 2/2009 | Cheah | 715/255 |

FOREIGN PATENT DOCUMENTS

CN 1620044 A 5/2005

* cited by examiner

*Primary Examiner* — Chae Ko
(74) *Attorney, Agent, or Firm* — Altis Law Group, Inc.

(57) ABSTRACT

A network error detecting method checks if a network connection device has an Internet protocol (IP) address, if domain name mapping of web pages is correct, and if data communication between a web browser and a web server is correct. Accordingly, the network connection device informs the web browser of an IP address error, a domain name mapping error, or a data communication error. The web browser displays the network errors to users when the network errors are detected.

15 Claims, 3 Drawing Sheets

NETWORK CONNECTION DEVICE AND METHOD FOR DETECTING NETWORK ERRORS

BACKGROUND

1. Technical Field

Embodiments of the present disclosure relate to computer network systems, and particularly to a network connection device and method for detecting network errors.

2. Description of Related Art

Web browsers are widely used to visit web pages on the Internet. The web browsers sometimes cannot open web pages due to network errors. Presently, software may be used to detect network errors; however, installation of the software may cause security risks to user computers. For example, hackers may exploit software loopholes in the software to attack the user computers.

DETAILED DESCRIPTION

All of the processes described herein may be embodied in, and fully automated via, functional code modules executed by one or more general purpose processors of a network connection device. The code modules may be stored in any type of storage medium. Some or all of the methods may alternatively be embodied in specialized hardware.

Figure 1:
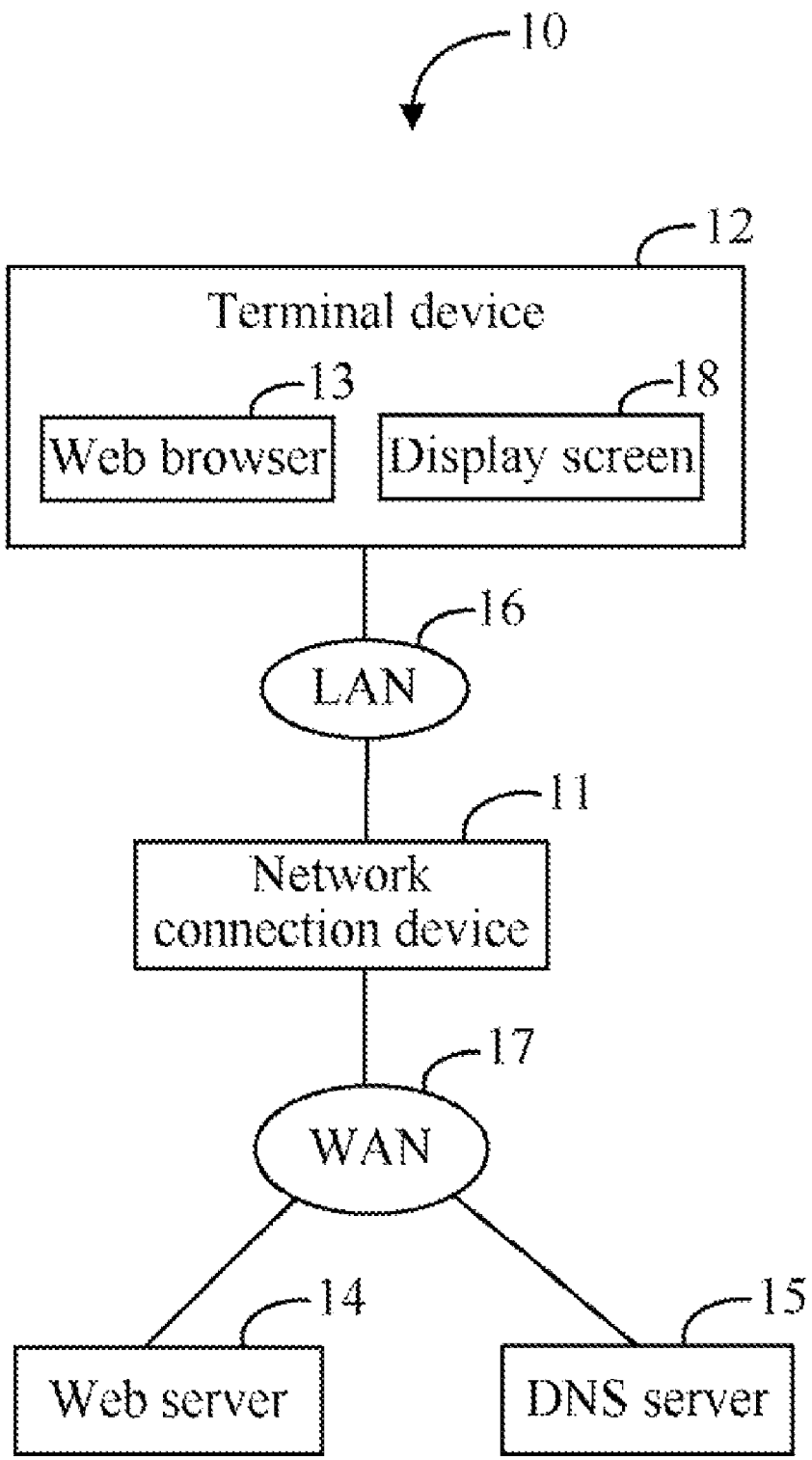
FIG. 1 is a block diagram of one embodiment of a system for detecting network errors.

FIG. 1 is a block diagram of one embodiment of a system 10 for detecting network errors, in which the system 10 includes a network connection device 11, a terminal device 12, at least one web server 14, and a domain name system (DNS) server 15. The network connection device 11 is connected to the terminal device 12 over a local area network (LAN) 16. The network connection device 11 is further connected to the web server 14 and the DNS server 15 over a wide area network (WAN) 17.

The terminal device 12 includes a web browser 13 and a display screen 18. The web browser 13 may include various proprietary or open source vendors, such as MICROSOFT INTERNET EXPLORER, MOZILLA FIREFOX, or OPERA. The web server 14 stores various web pages comprising text, images, and/or videos. The web browser 13 may retrieve the web pages from the web server 14 via the network connection device 11, and display the web pages on the display screen 18. In one embodiment, the network connection device 11 may be a router or a gateway. The terminal device 12 may be a personal computer, a mobile phone, or a personal digital assistant (PDA).

Figure 2:
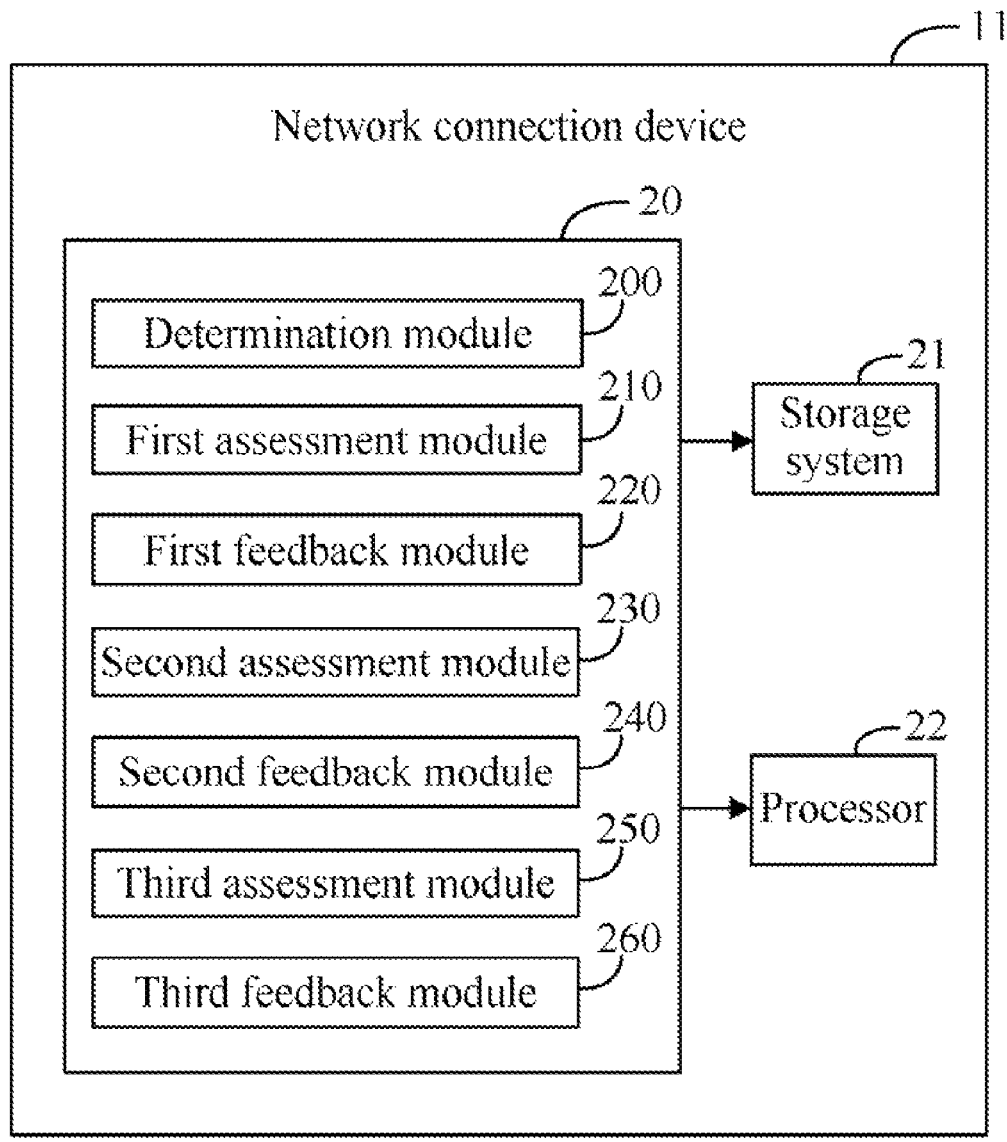
FIG. 2 is a block diagram of one embodiment of a network connection device in FIG. 1.

FIG. 2 is a block diagram of one embodiment of the network connection device 11 in FIG. 1. In one embodiment, the network connection device 11 includes a network detection unit 20, a storage system 21, and at least one processor 22. One or more computerized codes of the network detection unit 20 may be stored in the storage system 21 and executed by the at least one processor 22.

The network detection unit 20 may include a determination module 200, a first assessment module 210, a first feedback module 220, a second assessment module 230, a second feedback module 240, a third assessment module 250, and a third feedback module 260.

The determination module 200 is operable to determine whether to detect the occurrence of network errors across the LAN 16 and the WAN 17. In one embodiment, the determination module 200 determines to detect the occurrence of network errors when the web browser 13 cannot display a web page within a predetermined time interval, such as, for example, 30 seconds.

The first assessment module 210 is operable to check if the network connection device 11 has an Internet protocol (IP) address. The IP address is necessary for the network connection device 11 to communicate with the web server 14 and the DNS server 15.

The first feedback module 220 is operable to inform the web browser 13 of an IP address error if the network connection device 11 has no IP address. The web browser 13 may display the IP address error on the display screen 18 of the terminal device 12.

The second assessment module 230 is operable to check if domain name mapping of the web server 14 is correct. The domain name mapping refers to resolves a domain name of the web server 14, such as "www.baidu.com," into a corresponding IP address, such as "202.108.22.5". As such, the web server 14 is accessible by the WAN 17.

The second feedback module 240 is operable to inform the web browser 13 of a domain name mapping error if the domain name mapping is incorrect. The web browser 13 may display the domain name mapping error on the display screen 18 of the terminal device 12.

The third assessment module 250 is operable to check if data communication between the web browser 13 and the web server 14 is correct. The data communication may include:
(1) building a communication connection between the web browser 13 and the web server 14;
(2) sending an access request from the web browser 13 to the web server 14 for retrieving a web page;
(3) sending the web page from the web server 14 to the web browser 13; and
(4) terminating the communication connection.
Data communication between the web browser 13 and the web server 14 is considered incorrect if any step of the data communication fails.

The third feedback module 260 is operable to inform the web browser 13 of a data communication error if the data communication between the web browser 13 and the web server 14 is incorrect. The web browser 13 may display the data communication error on the display screen 18 of the terminal device 12.

Figure 3:
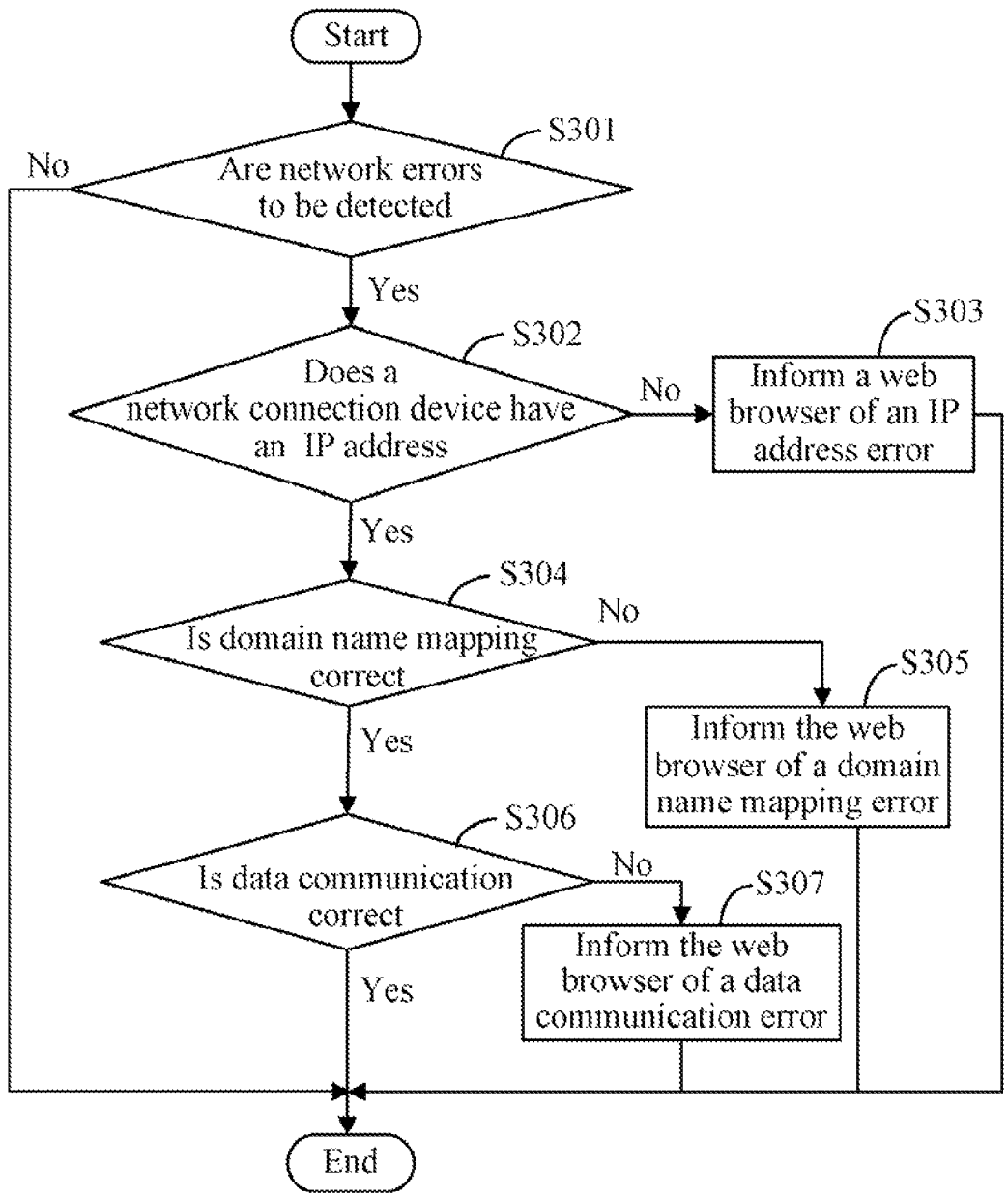
FIG. 3 is a flowchart of one embodiment of a method for detecting network errors implementing a system such as, for example, that of FIG. 1.

FIG. 3 is a flowchart of one embodiment of a method for detecting network errors implementing a system such as, for example, system 10 of FIG. 1. Depending on the embodiments, additional blocks may be added, others removed, and the ordering of the blocks may be changed.

In block S301, the determination module 200 determines whether to detect the occurrence of network errors across the LAN 16 and the WAN 17. In one embodiment, the determination module 200 determines to detect the occurrence of network errors when the web browser 13 cannot display a web page within a predetermined time interval such as, for example, 30 seconds. For example, the web browser 13 may send a message to the network connection device 11 if a web page cannot be opened within the predetermined time interval. The determination module 200 determines to detect the occurrence of network errors upon receiving the message. If the network errors are not to be detected, the procedure ends.

Otherwise, if the network errors are to be detected, in block 5302, the first assessment module 210 checks if the network connection device 11 has an IP address. In one embodiment, the first assessment module 210 checks if the network connection device 11 has a WAN IP address. The network connection device 11 communicates with the web server 14 and the DNS server 15 over the WAN 17 only if the network connection device 11 possesses the WAN IP address. In one embodiment, the WAN 17 is the Internet. The network connection device 11 may be allocated the WAN IP address by an Internet service provider (ISP).

If the network connection device 11 has no IP address, in block 5303, the first feedback module 220 informs the web browser 13 of an IP address error, and the procedure ends. The IP address error may be displayed on the display screen 18 of the terminal device 12.

Otherwise, if the network connection device 11 has an IP address, in block 5304, the second assessment module 230 checks whether domain name mapping of the web server 14 is correct. In one embodiment, the DNS server 15 translates a domain name of the web server 14 into an IP address of the web server 14. The domain name mapping is incorrect if the DNS server 15 cannot obtain the IP address of the web server 14. Otherwise, the domain name mapping is correct if the DNS server 15 obtains the IP address of the web server 14. In one example, an IP address of the web sever 14 with a domain name of "www.baidu.com" is 202.108.22.5. If the DNS server 15 cannot obtain the IP address, the domain name mapping is considered incorrect. Otherwise, if the DNS server 15 obtains the IP address, the domain name mapping is considered correct.

If the domain name mapping of the web server 14 is incorrect, in block 5305, the second feedback module 240 informs the web browser 13 of a domain name mapping error, and the procedure ends. The domain name mapping error may be displayed on the display screen 18 of the terminal device 12.

Otherwise, if the domain name mapping is correct, in block 5306, the third assessment module 250 checks if data communication between the web browser 13 and the web server 14 is correct. In one embodiment of the data communication method, a communication connection is built between the web browser 13 and the web server 14. The web browser 13 sends an access request to the web server 14 for retrieval of a web page. In response to the access request, the web server 14 returns the web page to the web browser 13. Finally, the communication connection is terminated. The third assessment module 250 may determine that the data communication is incorrect if any step of the data communication fails.

If the data communication between the web browser 13 and the web server 14 is incorrect, in block S307, the third feedback module 260 informs the web browser 13 of a data communication error. The data communication error may be displayed on the display screen 18 of the terminal device 12.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A network connection device, connected to a terminal device and at least one web server, the network connection device comprising:
   a determination module operable to determine whether a web browser of the network terminal device displays a web page of the web server within a predetermined time interval;
   a first assessment module operable to check if the network connection device has an Internet protocol (IP) address if the web browser does not display the web page within the predetermined time interval;
   a first feedback module operable to inform the web browser of the network terminal device of an IP address error if the network connection device has no IP address;
   a second assessment module operable to check if domain name mapping of the at least one web server is correct;
   a second feedback module operable to inform the web browser of a domain name mapping error if the domain name mapping of the at least one web server is incorrect;
   a third assessment module operable to check if data communication between the web browser and the at least one web server is correct; and
   a third feedback module operable to inform the web browser of a data communication error if the data communication between the web browser and the at least one web server is incorrect.

2. The network connection device of claim 1, wherein the network connection device is a router or a gateway.

3. The network connection device of claim 1, wherein the network connection device connects to the terminal device over a local area network (LAN) and connects to the at least one web server over a wide area network (WAN), and wherein the first assessment module checks if the network connection device has a WAN IP address.

4. The network connection device of claim 1, wherein the terminal device is a computer, a mobile phone, or a personal digital assistant (PDA).

5. The network connection device of claim 1, wherein the web browser displays the IP address error, the domain name mapping error, and the data communication error on a display screen of the terminal device.

6. A method for detecting network error utilized by a network connection device, the network connection device connected to a terminal device and at least one web server, the terminal device comprising a web browser, and the method comprising:
   determining whether the web browser displays a web page of the web server within a predetermined time interval;
   checking if the network connection device has an Internet protocol (IP) address if the web browser does not display the web page within the predetermined time interval;
   informing the web browser of an IP address error if the network connection device has no IP address;
   checking if domain name mapping of the at least one web server is correct;
   informing the web browser of a domain name mapping error if the domain name mapping of the at least one web server is incorrect;
   checking if data communication between the web browser and the at least one web server is correct; and
   informing the web browser of a data communication error if the communication between the web browser and the at least one web server is incorrect.

7. The method of claim 6, wherein the network connection device is a router or a gateway.

8. The method of claim 6, wherein the network connection device connects to the terminal device over a local area network (LAN) and connects to the at least one web server over a wide area network (WAN), and wherein checking if the network connection device has an IP address comprises checking if the network connection device has a WAN IP address.

9. The method of claim 6, wherein the terminal device is a computer, a mobile phone, or a personal digital assistant (PDA).

10. The method of claim 6, wherein the web browser displays the IP address error, the domain name mapping error, and the data communication error on a display screen of the terminal device.

11. A non-transitory computer-readable storage medium having stored thereon instructions that, when executed by a network connection device, cause the network connection device to execute a method for detecting network errors, the network connection device connected to a terminal device and at least one web server, the terminal device comprising a web browser, the method comprising:
   determining whether the web browser displays a web page of the web server within a predetermined time interval;
   checking if the network connection device has an Internet protocol (IP) address if the web browser does not display the web page within the predetermined time interval;
   informing the web browser of an IP address error if the network connection device has no IP address;
   checking if domain name mapping of the at least one web server is correct;
   informing the web browser of a domain name mapping error if the domain name mapping of the at least one web server is incorrect;
   checking if data communication between the web browser and the at least one web server is correct; and
   informing the web browser of a data communication error if the communication between the web browser and the at least one web server is incorrect.

12. The non-transitory computer-readable storage medium of claim 11, wherein the network connection device is a router or a gateway.

13. The non-transitory computer-readable storage medium of claim 11, wherein the network connection device connects to the terminal device over a local area network (LAN) and connects to the at least one web server over a wide area network (WAN), and wherein checking if the network connection device has an IP address comprises checking if the network connection device has a WAN IP address.

14. The non-transitory computer-readable storage medium of claim 11, wherein the terminal device is a computer, a mobile phone, or a personal digital assistant (PDA).

15. The non-transitory computer-readable storage medium of claim 11, wherein the web browser displays the IP address error, the domain name mapping error, and the data communication error on a display screen of the terminal device.

* * * * *